US009473619B2

United States Patent
Zhang et al.

(10) Patent No.: US 9,473,619 B2
(45) Date of Patent: Oct. 18, 2016

(54) SYSTEMS AND METHODS FOR CONTACTS MANAGEMENT

(71) Applicant: Tencent Technology (Shenzhen) Company Limited, Shenzhen (CN)

(72) Inventors: Xiaolong Zhang, Shenzhen (CN); Qianya Lin, Shenzhen (CN); Wen Zha, Shenzhen (CN); Shuo Wang, Shenzhen (CN); Yonglong Wei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/597,264

(22) Filed: Jan. 15, 2015

(65) Prior Publication Data
US 2015/0126149 A1 May 7, 2015

Related U.S. Application Data

(63) Continuation of application No. PCT/CN2014/079213, filed on Jun. 5, 2014.

(30) Foreign Application Priority Data

Sep. 24, 2013 (CN) .......................... 2013 1 0438737

(51) Int. Cl.
*H04M 1/725* (2006.01)
*H04M 3/22* (2006.01)
*H04W 4/14* (2009.01)
*H04W 8/18* (2009.01)
*H04M 1/2745* (2006.01)

(52) U.S. Cl.
CPC ... *H04M 1/72586* (2013.01); *H04M 1/274533* (2013.01); *H04M 3/2218* (2013.01); *H04W 4/14* (2013.01); *H04W 8/183* (2013.01); *H04M 1/27455* (2013.01)

(58) Field of Classification Search
CPC ......... H04M 1/72586; H04M 3/2218; H04W 8/183; H04W 4/14
See application file for complete search history.

(56) References Cited

U.S. PATENT DOCUMENTS

| 7,925,690 B2 * | 4/2011 | Smith et al. .................. 709/203 |
| 2006/0035632 A1 * | 2/2006 | Sorvari et al. ............... 455/418 |
| 2008/0207271 A1 * | 8/2008 | Krutik et al. ................. 455/566 |

FOREIGN PATENT DOCUMENTS

| CN | 102158580 A | 8/2011 |
| CN | 102377855 A | 3/2012 |
| CN | 102883031 A | 1/2013 |

OTHER PUBLICATIONS

Patent Cooperation Treaty, International Search Report and Written Opinion of the International Searching Authority, PCT/CN2014/079213, mailed Aug. 13, 2014.
Patent Cooperation Treaty, International Preliminary Report on Patentability, PCT/CN2014/079213, issued Mar. 29, 2016.

* cited by examiner

*Primary Examiner* — Leon Flores
(74) *Attorney, Agent, or Firm* — Jones Day

(57) ABSTRACT

Devices, terminals and methods are provided for contacts management. For example, one or more first contacts included in a communication log are received, wherein the communication log includes a call log or an SMS log; contact frequencies of the first contacts are calculated based on at least information associated with the communication log; one or more second contacts are selected to be managed from the first contacts based on at least information associated with the contact frequencies; if the second contacts exist in an address book is determined; and in response to the second contacts existing in the address book, the second contacts in the address book are extracted as frequent contacts; and a list of frequent contacts are generated based on at least information associated with the frequent contacts.

16 Claims, 12 Drawing Sheets

SYSTEMS AND METHODS FOR CONTACTS MANAGEMENT

CROSS-REFERENCES TO RELATED APPLICATIONS

This application is a continuation of International Application No. PCT/CN2014/079213, with an international filing date of Jun. 5, 2014, now pending, which claims priority to Chinese Patent Application No. 201310438737.7, filed Sep. 24, 2013, both applications being incorporated by reference herein for all purposes.

TECHNICAL FIELD

Certain embodiments of the present invention are directed to computer technology. More particularly, some embodiments of the invention provide systems and methods for data processing. Merely by way of example, some embodiments of the invention have been applied to contacts management. But it would be recognized that the invention has a much broader range of applicability.

BACKGROUND OF THE INVENTION

An address book is a basic component of a cell phone (e.g. an Android cell phone or an iOS cell phone), a tablet computer, a PDA, a mobile internet device (MID), a PAD or other terminals, and is mainly used to store data related to contacts. In some applications (i.e. APPs), an invitation operation, a sharing operation and/or other operations are usually performed on frequent contacts in an address book. In practice, however, a target frequent contact often needs to be searched for page by page in the address book in order to perform an invitation operation, a sharing operation and/or other operations. The efficiency of searching for frequent contacts is usually reduced when more and more contacts are added to the address book.

Hence it is highly desirable to improve the techniques for contacts management.

BRIEF SUMMARY

According to one embodiment, a method is provided for contacts management. For example, one or more first contacts included in a communication log are received, wherein the communication log includes a call log or an SMS log; contact frequencies of the first contacts are calculated based on at least information associated with the communication log; one or more second contacts are selected to be managed from the first contacts based on at least information associated with the contact frequencies; if the second contacts exist in an address book is determined; and in response to the second contacts existing in the address book, the second contacts in the address book are extracted as frequent contacts; and a list of frequent contacts are generated based on at least information associated with the frequent contacts.

According to another embodiment, a device for contacts management includes: a reading unit configured to receive one or more first contacts included in a communication log, wherein the communication log includes a call log or an SMS log; a calculation unit configured to calculate contact frequencies of the first contacts based on at least information associated with the communication log; a selection unit configured to select one or more second contacts to be managed from the first contacts based on at least information associated with the contact frequencies; a judgment unit configured to determine if the second contacts exist in an address book; an extraction unit configured to, in response to the second contacts existing in the address book, extract the second contacts in the address book as frequent contacts; and a generation unit configured to generate a list of frequent contacts based on at least information associated with the frequent contacts.

According to yet another embodiment, a terminal includes: a display and a device for contacts management. The device for contacts management includes: a reading unit configured to receive one or more first contacts included in a communication log, wherein the communication log includes a call log or an SMS log; a calculation unit configured to calculate contact frequencies of the first contacts based on at least information associated with the communication log; a selection unit configured to select one or more second contacts to be managed from the first contacts based on at least information associated with the contact frequencies; a judgment unit configured to determine if the second contacts exist in an address book; an extraction unit configured to, in response to the second contacts existing in the address book, extract the second contacts in the address book as frequent contacts; and a generation unit configured to generate a list of frequent contacts based on at least information associated with the frequent contacts. The display is connected to the device for contacts management to display the list of frequent contacts generated by the device for contacts management.

According to yet another embodiment, a non-transitory computer readable storage medium includes programming instructions for contacts management. The programming instructions are configured to cause one or more data processors to execute certain operations. For example, one or more first contacts included in a communication log are received, wherein the communication log includes a call log or an SMS log; contact frequencies of the first contacts are calculated based on at least information associated with the communication log; one or more second contacts are selected to be managed from the first contacts based on at least information associated with the contact frequencies; if the second contacts exist in an address book is determined; and in response to the second contacts existing in the address book, the second contacts in the address book are extracted as frequent contacts; and a list of frequent contacts are generated based on at least information associated with the frequent contacts.

For example, the systems and methods described herein are configured to directly find frequent contacts from a list of frequent contacts instead of searching for the frequent contacts page by page in the address book, hence enabling rapid discovery of frequent contacts and increasing the efficiency of searching for frequent contacts.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
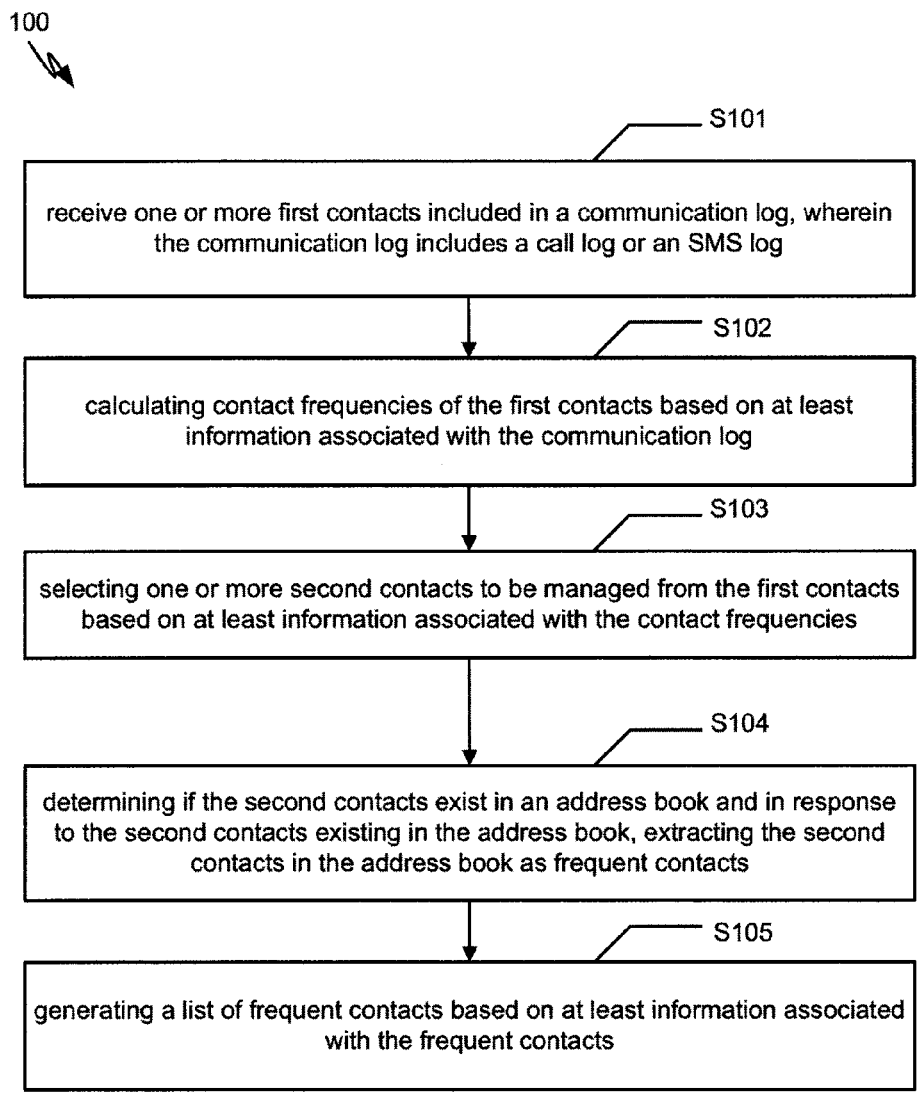
FIG. 1 is a simplified diagram showing a method for contacts management according to one embodiment of the present invention.

FIG. 1 is a simplified diagram showing a method for contacts management according to one embodiment of the present invention. This diagram is merely an example, which should not unduly limit the scope of the claims. One of ordinary skill in the art would recognize many variations, alternatives, and modifications. The method 100 includes at least the processes S101-S105.

According to one embodiment, the process S101 includes: receiving one or more first contacts included in a communication log, wherein the communication log includes a call log or an SMS log. For example, a terminal can be activated by a timer or an event input by a user to read the contacts included in the call log and/or the SMS log (i.e. contacts data). In another example, the process S102 includes: calculating contact frequencies of the first contacts based on at least information associated with the communication log. In yet another example, if the communication log includes a call log, the process S102 includes the following operations: 11) the terminal receives one or more call descriptions (R) associated with the first contacts, wherein the call descriptions (R) include a first number (N1) of calls associated with the first contacts, and 12) the terminal calculates the contact frequencies (k) of the first contacts based on at least information associated with a total number (TR) of calls and the call descriptions (R) associated with the first contacts. As an example, the terminal can calculate a ratio of the number (N1) of calls with a particular contact included in the call descriptions (R) corresponding to the particular contact to the total number (TR) of all calls and use the ratio as a contact frequencies (k) of the particular contact.

According to another embodiment, the call descriptions (R) further include a first list (C1) of beginning times of the calls associated with the first contacts and a second list (D1) of call periods of the calls associated with the first contacts. For example, the operation 12) described above includes: the terminal uses the total number (TR) of all calls and the call descriptions (R) corresponding to the first contacts (e.g., including the number (N1) of calls with the first contacts, the list (C1) of beginning times of calls with the first contacts and the list (D1) of call periods) as input parameters to the contact-frequency-calculation function (fun) for calculation of the contact frequencies (k) of the first contacts.

According to yet another embodiment, if the communication log includes an SMS log, the process S102 includes the following operations: 21) the terminal receives one or more SMS descriptions (M) associated with the first contacts, wherein the SMS descriptions (M) include a second number (N2) of SMS messages associated with the first contacts; and 22) the terminal calculates the contact frequencies (k) of the first contacts based on at least information associated with a total number (TS) of SMS messages and the SMS descriptions (M) associated with the first contacts. For example, the terminal can calculate a ratio of the number (N2) of SMS messages associated with a particular contact included in the SMS descriptions (M) corresponding to the particular contact to the total number (TS) of all SMS messages and use the ratio as a contact frequency (k) of the particular contact. In another example, the SMS descriptions (M) further include a first list (T2) of sending times and receiving times of the SMS messages associated with the first contacts. As an example, the operation 22) described above includes: the terminal calculates the contact frequencies (k) of the first contacts using a contact-frequency-calculation function (fun), the total number (TS) of SMS messages and the SMS descriptions (M) associated with the first contacts being used as input parameters to the contact-frequency-calculation function (fun).

In one embodiment, if the communication log includes a call log and an SMS log, the process S102 includes the following operations: 31) the terminal receives one or more call descriptions (R) associated with one or more third contacts, wherein the call descriptions (R) include a first number (N1) of calls associated with the third contacts, the third contacts being included in the first contacts; 32) the terminal receives one or more SMS descriptions (M) associated with one or more fourth contacts, wherein the SMS descriptions (M) include a second number (N2) of SMS messages associated with the fourth contacts, the fourth contacts being included in the first contacts; and 33) in response to the fourth contacts being the same as the third contacts, calculating the contact frequencies (k) of the first contacts based on at least information associated with a total number (TR) of calls, the call descriptions (R) associated with the third contacts, a total number (TS) of SMS messages and the SMS descriptions (M) associated with the fourth contacts. For example, the terminal can calculate a ratio of the sum of N1 and N2 to the sum of TR and TS and use the ratio as a contact frequencies (k) of a contact.

In another embodiment, the call descriptions (R) further include a first list (C1) of beginning times of the calls associated with the third contacts and a second list (D1) of call periods of the calls associated with the third contacts and the SMS descriptions (M) further include a third list (T2) of sending times and receiving times of the SMS messages associated with the fourth contacts. For example, the operation 33) described above includes: the terminal calculates the contact frequencies (k) of the first contacts using a contact-frequency-calculation function (fun), the total number (TR) of calls, the call descriptions (R) associated with the third contacts, the total number (TS) of SMS messages and the SMS descriptions (M) associated with the fourth contacts (e.g., including the second number (N2) of SMS messages associated with the fourth contacts and the third list (T2) of sending times and receiving times of the SMS messages associated with the fourth contacts) being used as input parameters to the contact-frequency-calculation function (fun).

In yet another embodiment, the process S103 includes: selecting one or more second contacts to be managed from the first contacts based on at least information associated with the contact frequencies. For example, the terminal can sort the first contacts in a descending order based on at least information associated with the contact frequencies and select a number of contacts (e.g. 10 contacts) from the sorted first contacts from the top down (e.g., starting from the largest contact frequency) as the second contacts. As an example, the terminal can select a number of contacts with a contact frequency larger than a preset threshold from the sorted first contacts as the second contacts to be managed. The preset threshold can be set according to actual conditions.

According to one embodiment, the process S104 includes determining if the second contacts exist in an address book and in response to the second contacts existing in the address book, extracting the second contacts in the address book as frequent contacts. For example, the terminal does not need to extract contacts to be managed as the frequent contacts if it is determined that the contacts to be managed do not exist in the address book. As an example, the process S105 includes generating a list of frequent contacts based on at least information associated with the frequent contacts. As another example, the terminal can sort the frequent contacts according to the contact frequencies (k) in a descending order and then generate a list of frequent contacts.

Figure 2:
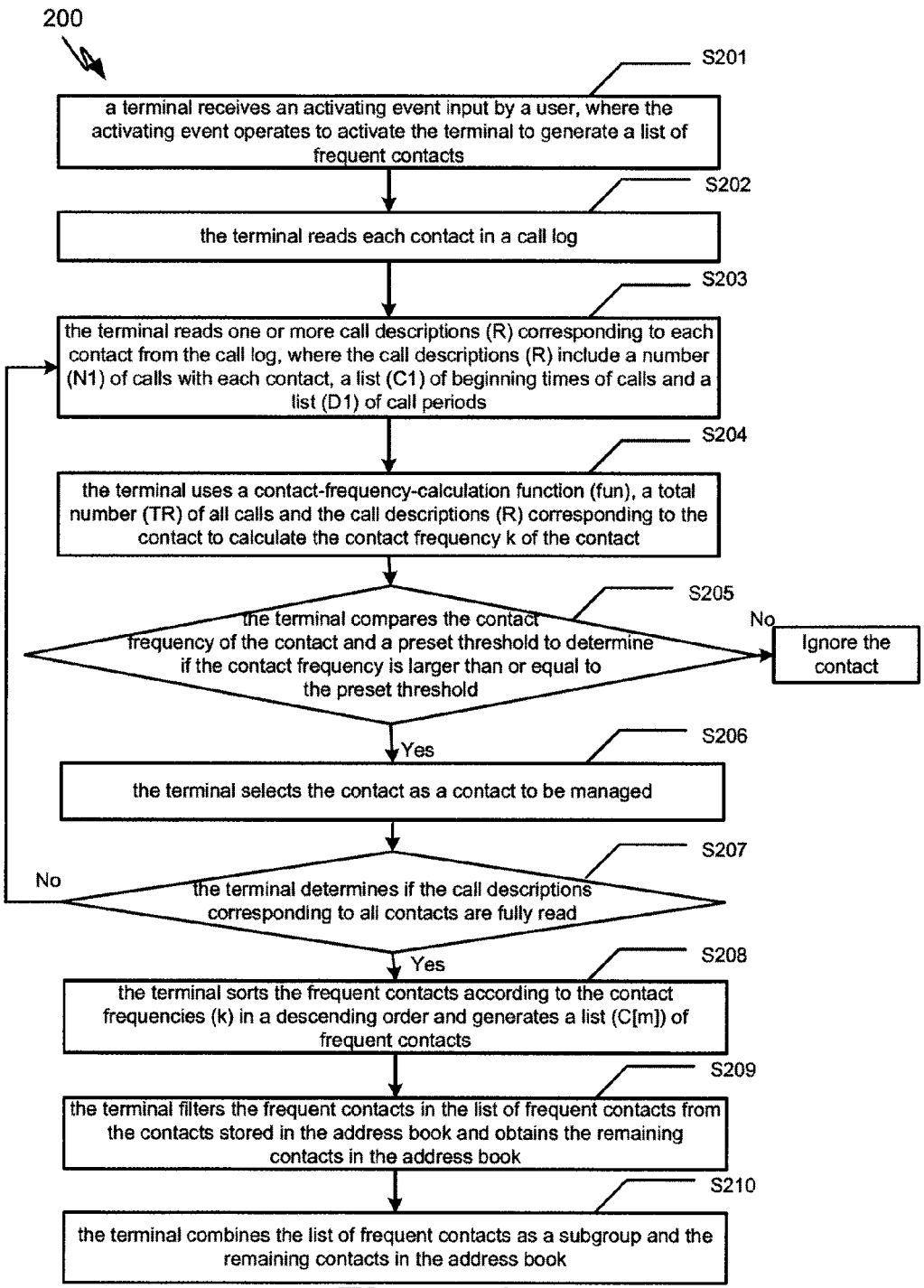
FIG. 2 is a simplified diagram showing a method for contacts management according to another embodiment of the present invention.

FIG. 2 is a simplified diagram showing a method for contacts management according to another embodiment of the present invention. This diagram is merely an example, which should not unduly limit the scope of the claims. One of ordinary skill in the art would recognize many variations, alternatives, and modifications. The method 200 includes at least the processes S201-S210.

According to one embodiment, during the process S201, a terminal receives an activating event input by a user, where the activating event operates to activate the terminal to generate a list of frequent contacts. For example, the activating event includes a user hanging up a call, the user sending an SMS, etc. In another example, during the process S202, the terminal reads each contact in a call log. In yet another example, during the process S203, the terminal reads one or more call descriptions (R) corresponding to each contact from the call log, where the call descriptions (R) include a number (N1) of calls with each contact, and a list (C1) of beginning times of calls and a list (D1) of call periods. That is, R=(N1, C1, D1). As an example, during the process S204, the terminal uses a contact-frequency-calculation function (fun), a total number (TR) of all calls and the call descriptions (R) corresponding to the contact that is read to calculate the contact frequency (k) of the contact. That is, k=fun (R, TR). As another example, the calculation process of fun (R, TR) includes calculation of a weighted sum of R and TR.

According to another embodiment, during the process S205, the terminal compares the contact frequency (k) of the contact and a preset threshold to determine if the contact frequency (k) is larger than or equal to the preset threshold. For example, if the contact frequency of the contact is larger than or equal to the preset threshold, the process S206 is executed. Otherwise, the contact is ignored. As an example, during the process S206, the terminal selects the contact as a contact to be managed. As another example, during the process S207, the terminal determines if the call descriptions (R) corresponding to all contacts are fully read. If the call descriptions (R) corresponding to the contacts are fully read, the process S208 is executed. Otherwise, the process S203 is executed. In yet another example, during the process S208, the terminal sorts the frequent contacts according to the contact frequencies (k) in a descending order and generates a list (C[m]) of frequent contacts, where m refers to the number of frequent contacts included in the list of frequent contacts. In yet another example, during S209, the terminal filters the frequent contacts in the list of frequent contacts from the contacts stored in the address book and obtains the remaining contacts in the address book. In yet another example, during the process S210, the terminal combines the list of frequent contacts as a subgroup and the remaining contacts in the address book. In some embodiments, the processes S209 and S210 are activated by the user's click on the address book.

Figure 3:
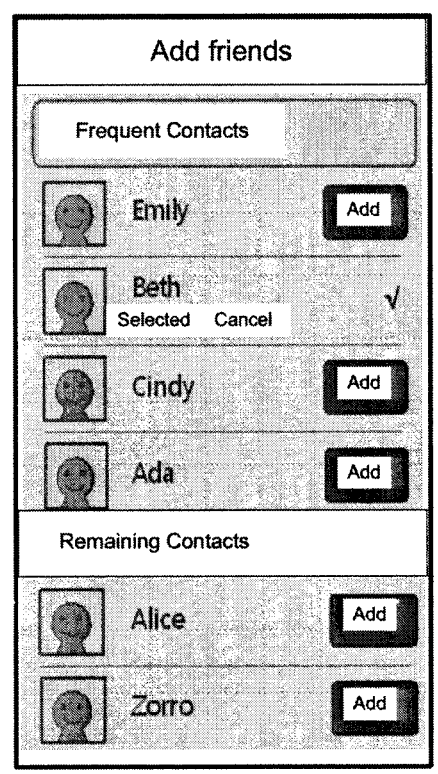
FIG. 3 is a simplified diagram showing an interface for adding friends according to one embodiment of the present invention.

FIG. 3 is a simplified diagram showing an interface for adding friends according to one embodiment of the present invention. This diagram is merely an example, which should not unduly limit the scope of the claims. One of ordinary skill in the art would recognize many variations, alternatives, and modifications.

According to one embodiment, as shown in FIG. 3, a terminal can combine a list of frequent contacts as a subgroup with the remaining contacts stored in the address book by placing the list of frequent contacts above the remaining contacts. For example, a user can select a particular frequent contact (e.g., Beth) and add the frequent contact as a friend (e.g., a SNS friend or a friend in the circle).

Figure 4:
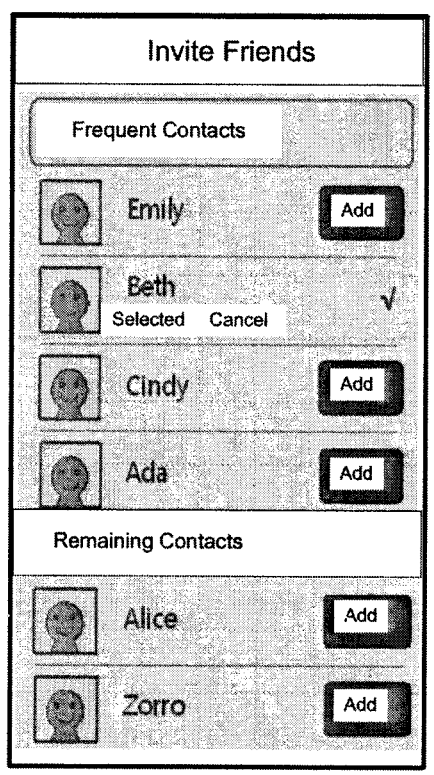
FIG. 4 is a simplified diagram showing an interface for inviting friends according to one embodiment of the present invention.

FIG. 4 is a simplified diagram showing an interface for inviting friends according to one embodiment of the present invention. This diagram is merely an example, which should not unduly limit the scope of the claims. One of ordinary skill in the art would recognize many variations, alternatives, and modifications.

According to one embodiment, as shown in FIG. 4, a terminal can combine a list of frequent contacts as a subgroup with the remaining contacts stored in the address book by placing the list of frequent contacts above the remaining contacts. For example, a user can select a particular frequent contact (e.g., Beth) and invite the contact to join an application (e.g., a game or an instant messaging tool).

Figure 5:
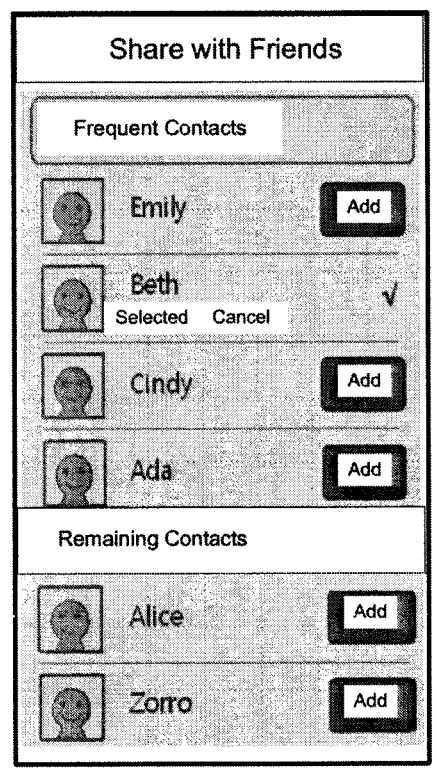
FIG. 5 is a simplified diagram showing an interface for sharing with friends according to one embodiment of the present invention.

FIG. 5 is a simplified diagram showing an interface for sharing with friends according to one embodiment of the present invention. This diagram is merely an example, which should not unduly limit the scope of the claims. One of ordinary skill in the art would recognize many variations, alternatives, and modifications.

According to one embodiment, as shown in FIG. 5, a terminal can combine a list of frequent contacts as a subgroup with the remaining contacts stored in the address book by placing the list of frequent contacts above the remaining contacts. For example, a user can select a particular frequent contact (e.g., Beth) and share an application (e.g., a game) with the contact. In another example, according to a threshold value w, the first w frequent contacts in the list (C[m]) of frequent contacts are selected and displayed.

Figure 6:
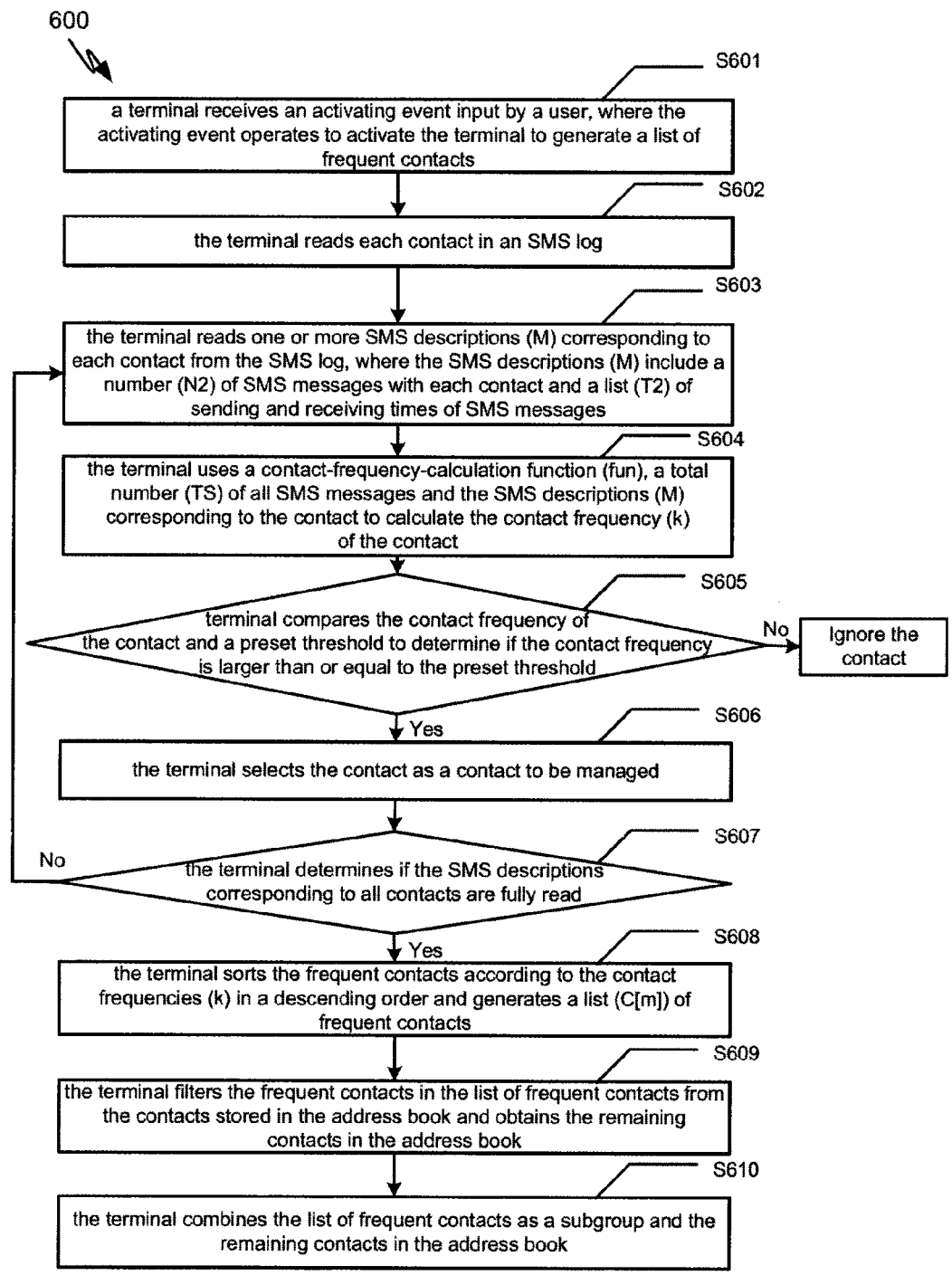
FIG. 6 is a simplified diagram showing a method for contacts management according to yet another embodiment of the present invention.

FIG. 6 is a simplified diagram showing a method for contacts management according to yet another embodiment of the present invention. This diagram is merely an example, which should not unduly limit the scope of the claims. One of ordinary skill in the art would recognize many variations, alternatives, and modifications. The method 600 includes at least the processes S601-S610.

According to one embodiment, during the process S601, a terminal receives an activating event input by a user, where the activating event operates to activate the terminal to generate a list of frequent contacts. For example, the activating event includes a user hanging up a call, the user sending an SMS, etc. In another example, during the process S602, the terminal reads each contact in an SMS log. In yet another example, during the process S603, the terminal reads one or more SMS descriptions (M) corresponding to each contact from the SMS log, where the SMS descriptions (M) include a number (N2) of SMS messages with each contact and a list (T2) of sending and receiving times of SMS messages. That is, M=(N2, T2). In yet another example, during the process S604, the terminal uses a contact-frequency-calculation function (fun), a total number (TS) of all SMS messages and the SMS descriptions (M) corresponding to the contact that is read to calculate the contact frequency (k) of the contact. That is, k=fun (M, TS). As an example, the calculation process of fun (M, TS) includes calculation of a weighted sum of M and TS.

According to another embodiment, during the process S605, the terminal compares the contact frequency (k) of the contact and a preset threshold to determine if the contact frequency (k) is larger than or equal to the preset threshold. For example, if the contact frequency (k) is larger than or equal to the preset threshold, the process S606 is executed. Otherwise, the contact is ignored. In another example, during the process S606, the terminal selects the contact as a contact to be managed. In yet another example, during the process S607, the terminal determines if the SMS descriptions (M) corresponding to all contacts are fully read. In yet another example, if the SMS descriptions (M) corresponding to all contacts are fully read, the process S608 is executed. Otherwise, the process S603 is executed.

According to yet another embodiment, during the process S608, the terminal sorts the frequent contacts according to the contact frequencies (k) in a descending order and generates a list (C[m]) of frequent contacts, where m refers to the number of frequent contacts included in the list of frequent contacts. For example, during the process S609, the terminal filters the frequent contacts in the list of frequent contacts from the contacts stored in the address book and obtains the remaining contacts in the address book. In yet another example, during the process S210, the terminal combines the list of frequent contacts as a subgroup and the remaining contacts in the address book. In some embodiments, the processes S209 and S210 are activated by the user's click on the address book. In yet another example, according to a threshold value w, the first w frequent contacts in the list (C[m]) of frequent contacts are selected and displayed.

Figure 7:
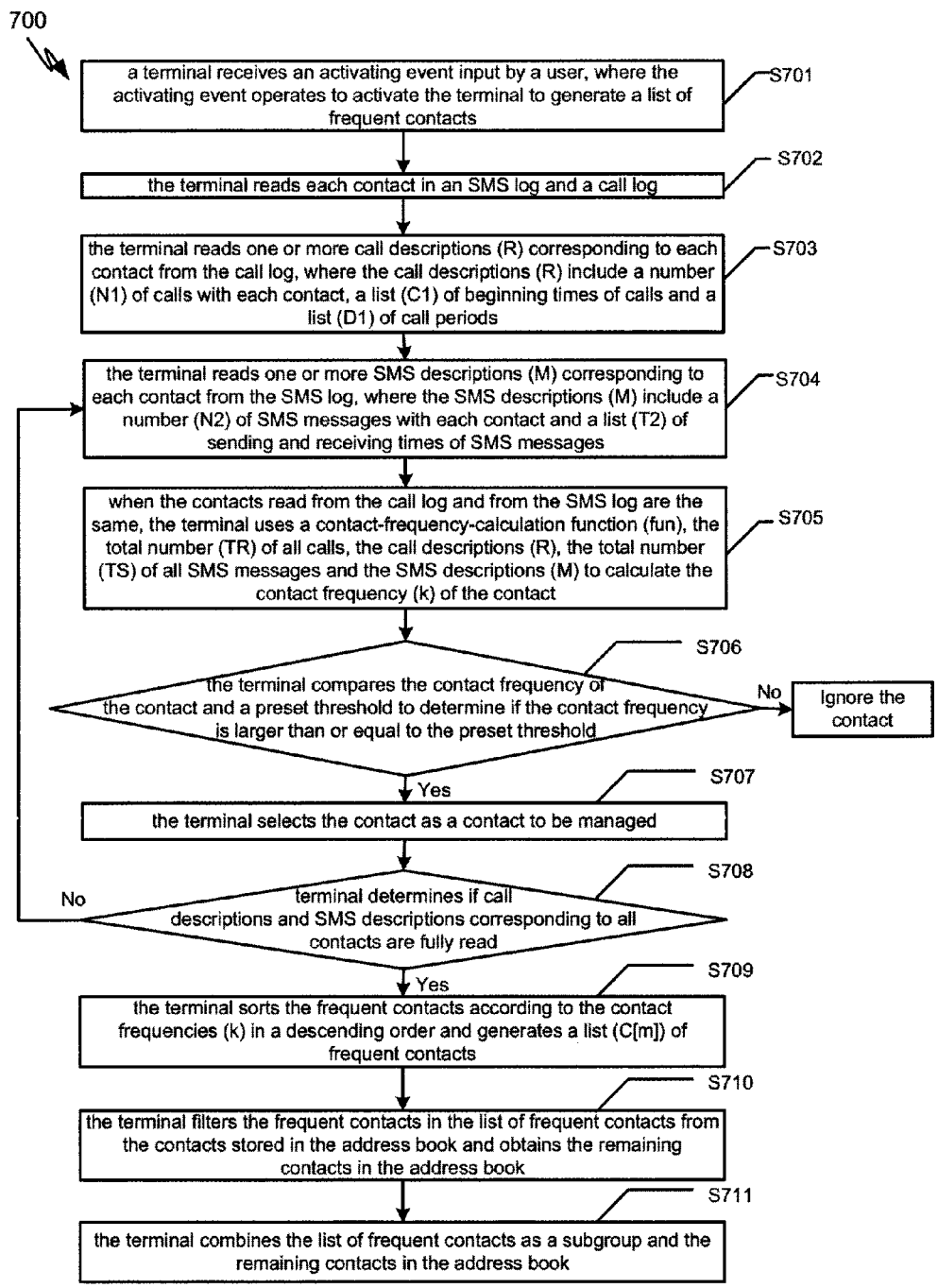
FIG. 7 is a simplified diagram showing a method for contacts management according to yet another embodiment of the present invention.

FIG. 7 is a simplified diagram showing a method for contacts management according to yet another embodiment of the present invention. This diagram is merely an example, which should not unduly limit the scope of the claims. One of ordinary skill in the art would recognize many variations, alternatives, and modifications. The method 700 includes at least the processes S701-S710.

According to one embodiment, during the process S701, a terminal receives an activating event input by a user, where the activating event operates to activate the terminal to generate a list of frequent contacts. For example, the activating event includes a user hanging up a call, the user sending an SMS, etc. In another example, during the process S702, the terminal reads each contact in a call log and an SMS log. In yet another example, during the process S703, the terminal reads the call descriptions (R) corresponding to each contact from the call log, where the call descriptions (R) include a number (N1) of calls with each contact, a list (C1) of beginning times of calls and a list (D1) of call periods. That is, R=(N1, C1, D1). In yet another example, during the process S704, the terminal reads the SMS descriptions (M) corresponding to each contact from the SMS log, where the SMS descriptions (M) include a number (N2) of SMS messages with each contact and a list (T2) of sending and receiving times of SMS messages. That is, M=(N2, T2). In some embodiments, the processes S703 and S704 can be executed in different orders.

According to another embodiment, during the process S705, when the contact read from the call log and the contact read from the SMS log are the same, the terminal uses a contact-frequency-calculation function (fun), the total number (TR) of all calls, the call descriptions (R) corresponding to the contact read from the call log, the total number (TS) of all SMS messages and the SMS descriptions (M) corresponding to the contact read from the SMS log to calculate the contact frequency (k) of the contact. That is, k=fun (R, M, TR, TS). For example, the calculation process of fun (R, M, TR, TS) includes calculation of a weighted sum of R, M, TR and TS.

According to yet another embodiment, during the process S706, the terminal compares the contact frequency (k) of the contact and a preset threshold to determine if the contact frequency (k) is larger than or equal to the preset threshold. For example, if the contact frequency (k) is larger than or equal to the preset threshold, the process S707 is executed. In another example, the contact is ignored. In yet another example, during the process S707, the terminal selects the contact as a contact to be managed. In yet another example, during the process S708, the terminal determines if the call descriptions (R) and the SMS descriptions (M) corresponding to all contacts are fully read. In yet another example, if the call descriptions (R) and the SMS descriptions (M) corresponding to all contacts are fully read, the process S709 is executed. Otherwise, the process S703 is executed. In yet another example, during the process S709, the terminal sorts the frequent contacts according to the contact frequencies (k) in a descending order and generates a list (C[m]) of frequent contacts, where m refers to the number of frequent contacts included in the list of frequent contacts. In yet another example, during the process S710, the terminal filters the frequent contacts in the list of frequent contacts from the contacts stored in the address book and obtains the remaining contacts in the address book. In yet another example, during the process S711, the terminal combines the list of frequent contacts as a subgroup and the remaining contacts in the address book. In some embodiments, the processes S710 and S711 are activated by the user's click on the address book. In yet another example, according to a threshold value w, the first w frequent contacts in the list (C[m]) of frequent contacts are selected and displayed.

In some embodiments, the method 100, the method 200, the method 600, and/or the method 700 are applied to one or more terminals, such as a cell phone (e.g. an Android cell phone or an iOS cell phone), a tablet computer, a PDA, a mobile internet device (MID), a PAD or other terminals. In certain embodiments, when the method 100, the method 200, the method 600, and/or the method 700 are applied to a terminal, the terminal responds to one or more operating instructions regarding the frequent contacts by outputting an identification of an application shared with and/or recommended to the frequent contacts, hence enriching the performances of the terminal.

Figure 8:
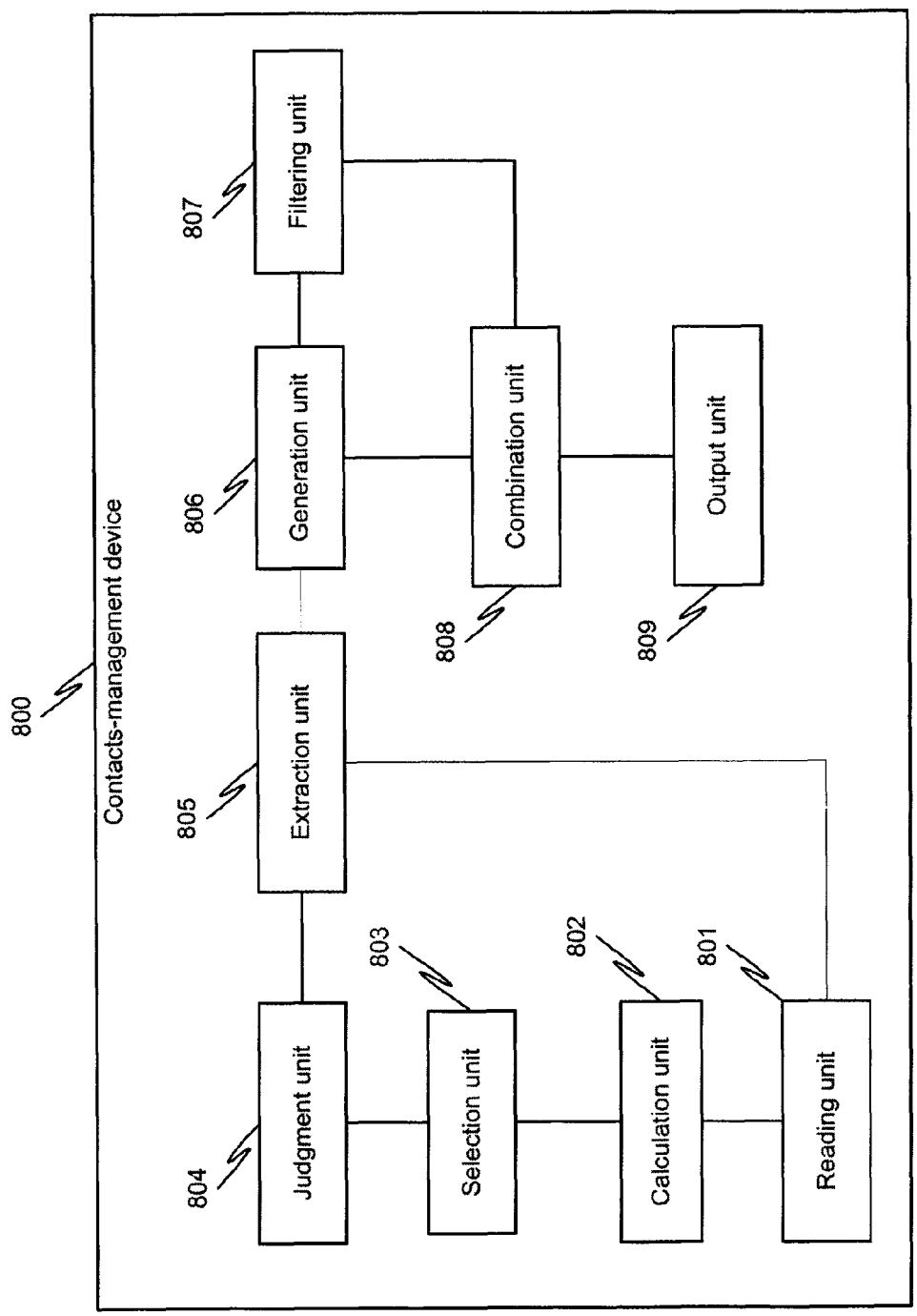
FIG. 8 is a simplified diagram showing a device for contacts management according to one embodiment of the present invention.

FIG. 8 is a simplified diagram showing a device for contacts management according to one embodiment of the present invention. This diagram is merely an example, which should not unduly limit the scope of the claims. One of ordinary skill in the art would recognize many variations, alternatives, and modifications.

According to one embodiment, the contacts-management device 800 includes: a reading unit 801 configured to read contacts included in a communication log, where the communication log comprises a call log and/or an SMS log. For example, the contacts-management device 800 further includes: a calculation unit 802 configured to calculate contact frequencies of the contacts according to the call log and/or the SMS log, a selection unit 803 configured to select contacts to be managed from the contacts that are read according to the contact frequencies, and a judgment unit 804 configured to determine if the contacts to be managed exist in the address book. In another example, the contacts-management device 800 includes: an extraction unit 805 configured to extract and set the contacts to be managed in the address book as frequent contacts if the contacts to be managed exist in the address book, and a generation unit 806 configured to generate a list of frequent contacts according to the frequent contacts.

According to another embodiment, the contacts-management device 800 includes: a filtering unit 807 configured to filter the frequent contacts in the list of frequent contacts from the contacts stored in the address book and obtain remaining contacts in the address book, and a combination unit 808 configured to combine the list of frequent contacts as a subgroup and the remaining contacts in the address book. For example, the combination unit 808 is further configured to place the list of frequent contacts as a subgroup above the remaining contacts stored in the address book. In another example, the contacts-management device 800 further includes: an output unit 809 configured to respond to one or more operating instructions regarding the frequent contacts by outputting an identification of an application shared with and/or recommended to the frequent contacts.

Figure 9:
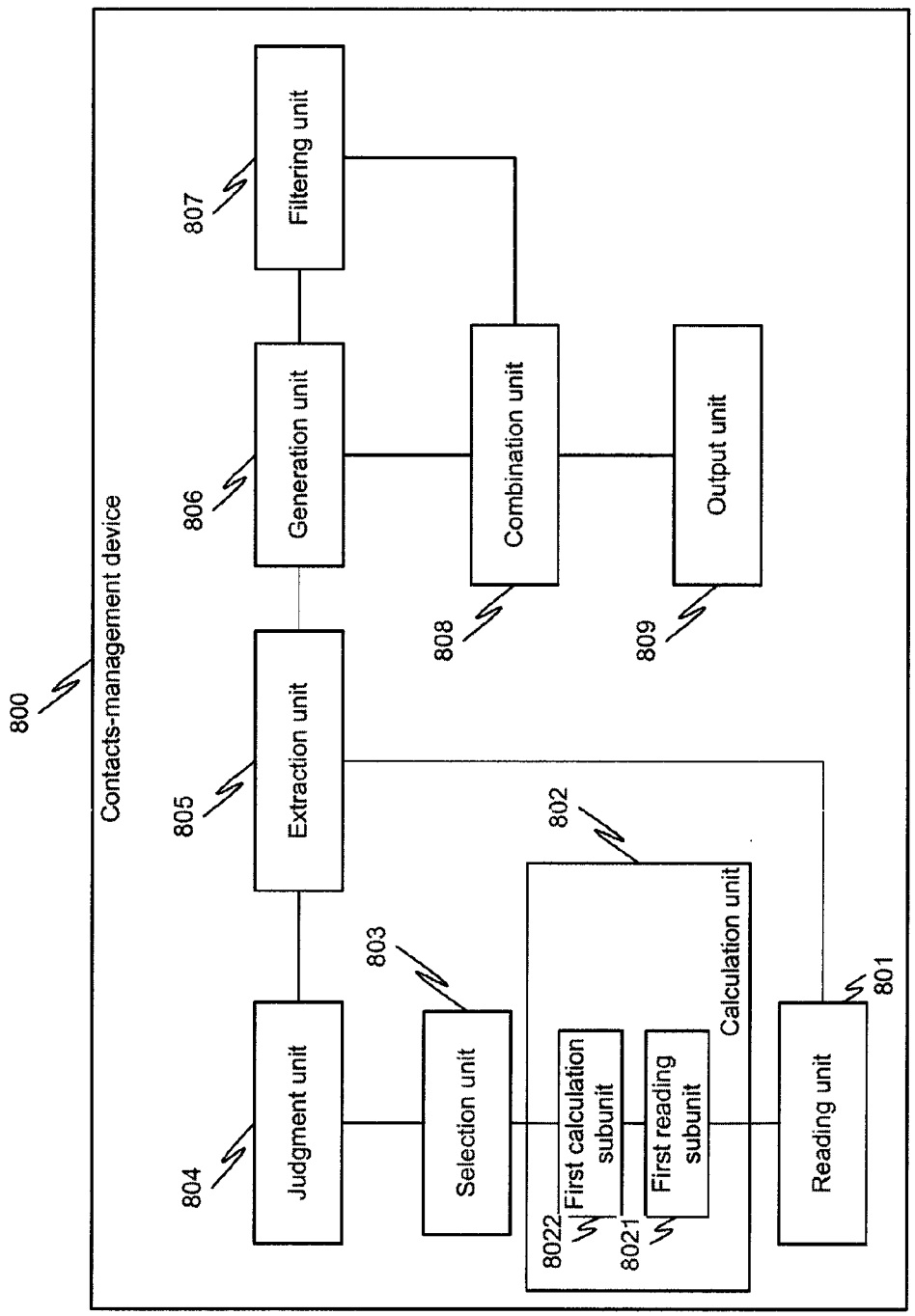
FIG. 9 is a simplified diagram showing a device for contacts management according to another embodiment of the present invention.

FIG. 9 is a simplified diagram showing the device 800 for contacts management according to another embodiment of the present invention. This diagram is merely an example, which should not unduly limit the scope of the claims. One of ordinary skill in the art would recognize many variations, alternatives, and modifications.

According to one embodiment, the calculation unit 802 includes: a first reading subunit 8021 configured to read call descriptions (R) corresponding to a contact included in the call log, where the call descriptions (R) include a number (N1) of calls associated with the contact, and a first calculation unit 8022 configured to calculate the contact frequencies (k) of the contact according to a total number (TR) of all calls and the call descriptions (R) corresponding to the contact. For example, the call descriptions (R) include a list (C1) of beginning times of calls with the contact and a list (D1) of call periods. In another example, the first calculation subunit 8022 is further configured to use the total number (TR) of all calls and the call descriptions (R) corresponding to the contact (e.g., including the number (N1) of calls with the contact, the list (C1) of beginning times of calls with the contact and the list (D1) of call periods) as input parameters to a contact-frequency-calculation function (fun) for calculation of the contact frequencies (k) of the contact.

Figure 10:
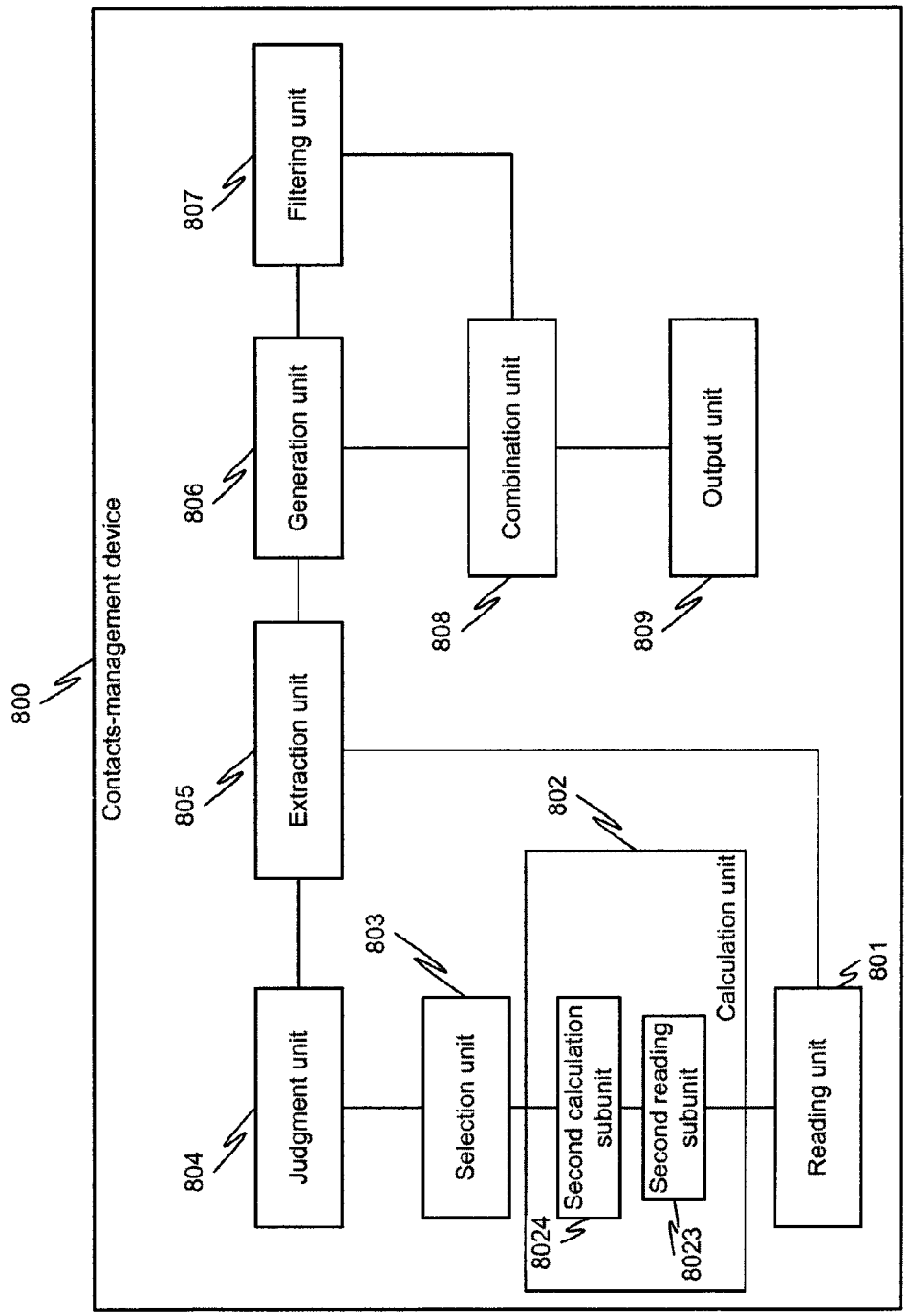
FIG. 10 is a simplified diagram showing a device for contacts management according to yet another embodiment of the present invention.

FIG. 10 is a simplified diagram showing the device 800 for contacts management according to yet another embodiment of the present invention. This diagram is merely an example, which should not unduly limit the scope of the claims. One of ordinary skill in the art would recognize many variations, alternatives, and modifications.

According to one embodiment, the calculation unit 802 includes: a second reading subunit 8023 configured to read SMS descriptions (M) corresponding to a contact included in the SMS log, where the SMS descriptions (M) include a number (N2) of SMS messages associated with the contact, and a second calculation subunit 8024 configured to calculate the contact frequencies (k) of the contact according to a total number (TS) of all SMS messages and the SMS descriptions (M) corresponding to the contact. For example, the SMS descriptions (M) include a list (T2) of sending and receiving times of the SMS messages associated with the contact. In another example, the second calculation subunit 8024 is further configured to use a total number (TS) of all SMS messages and the SMS descriptions (M) corresponding to the contact (e.g., including the number (N2) of SMS messages with the contact and the list (T2) of sending and receiving times of the SMS messages with the contact) as the input parameters to a contact-frequency-calculation function (fun) for calculation of the contact frequencies (k) of the contact.

Figure 11:
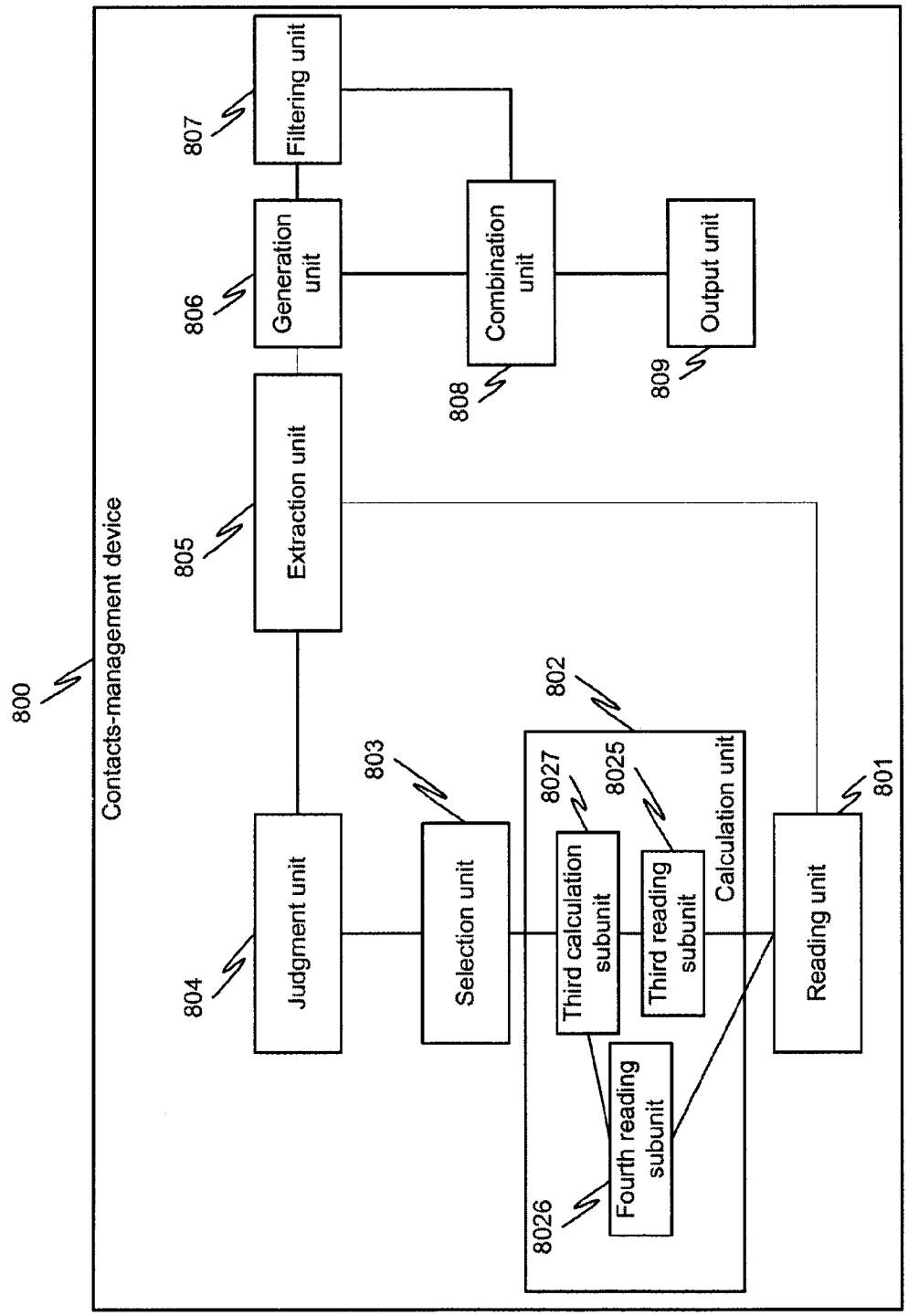
FIG. 11 is a simplified diagram showing a device for contacts management according to yet another embodiment of the present invention.

FIG. 11 is a simplified diagram showing the device 800 for contacts management according to yet another embodiment of the present invention. This diagram is merely an example, which should not unduly limit the scope of the claims. One of ordinary skill in the art would recognize many variations, alternatives, and modifications.

According to one embodiment, the calculation unit 802 includes: a third reading subunit 8025 configured to read call descriptions (R) corresponding to a contact included in the call log, where the call descriptions (R) include a number (N1) of calls associated with the contact, a fourth reading subunit 8026 configured to read SMS descriptions (M) corresponding to the contact included in the SMS log, where the SMS descriptions (M) include a number (N2) of SMS messages associated with the contact, and a third calculation subunit 8027 configured to, when the contact read from the call log and the contact read from the SMS log are the same, calculate the contact frequencies (k) of the contact according to a total number (TR) of all calls and the call descriptions (R) corresponding to the contact as well as a total number (TS) of all SMS messages and the SMS descriptions (M) corresponding to the contact.

According to another embodiment, the call descriptions (R) include a list (C1) of beginning times of calls with the contact and a list (D1) of call periods. For example, the SMS descriptions (M) include a list (T2) of sending and receiving times of SMS messages associated with the contact. In another example, the third calculation subunit 8027 is further configured to, when the contact read from the call log and the contact read from the SMS log are the same, use the total number (TR) of all calls, the call descriptions (R) corresponding to the contact, the total number (TS) of all SMS messages and the SMS descriptions (M) corresponding to the contact as input parameters to a contact-frequency-calculation function (fun) for calculation of the contact frequencies (k) of the contact. In yet another example, the selection unit 803 is further configured to sort the contacts that are read according to the contact frequencies in a descending order and select a plurality of contacts from the top down as contacts to be managed. In yet another example, the selection unit 803 is further configured to select the contacts with a contact frequency larger than a preset threshold from the contacts to be managed. In some embodiments, as shown in FIG. 8, FIG. 9, FIG. 10, and/or FIG. 11, the generation unit 806 is further configured to sort the frequent contacts according to the contact frequencies (k) in a descending order and then generate a list of frequent contacts.

Figure 12:
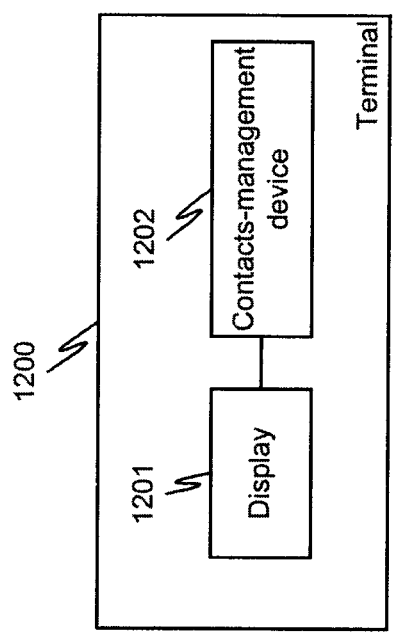
FIG. 12 is a simplified diagram showing a terminal according to one embodiment of the present invention.

FIG. 12 is a simplified diagram showing a terminal according to one embodiment of the present invention. This diagram is merely an example, which should not unduly limit the scope of the claims. One of ordinary skill in the art would recognize many variations, alternatives, and modifications.

According to one embodiment, the terminal 1200 can be a cell phone (e.g. an Android cell phone or an iOS cell phone), a tablet computer, a PDA, a mobile interne device (MID), a PAD or any other terminal. As show in FIG. 12, the terminal 1200 includes a display 1201 and a contacts-management device 1202, in some embodiments. For example, the contacts-management device. 1202 is the same as the contacts-management device 800 as shown in FIG. 8, FIG. 9, FIG. 10, and/or FIG. 11. In another example, the display 1201 is connected to the contacts-management device 1202 to display a list of frequent contacts generated by the contacts-management device 1202.

According to one embodiment, a method is provided for contacts management. For example, one or more first contacts included in a communication log are received, wherein the communication log includes a call log or an SMS log; contact frequencies of the first contacts are calculated based on at least information associated with the communication log; one or more second contacts are selected to be managed from the first contacts based on at least information associated with the contact frequencies; if the second contacts exist in an address book is determined; and in response to the second contacts existing in the address book, the second contacts in the address book are extracted as frequent contacts; and a list of frequent contacts are generated based on at least information associated with the frequent contacts. For example, the method is implemented according to at least FIG. 1, FIG. 2, FIG. 6, and/or FIG. 7.

According to another embodiment, a device for contacts management includes: a reading unit configured to receive one or more first contacts included in a communication log, wherein the communication log includes a call log or an SMS log; a calculation unit configured to calculate contact frequencies of the first contacts based on at least information associated with the communication log; a selection unit configured to select one or more second contacts to be managed from the first contacts based on at least information associated with the contact frequencies; a judgment unit configured to determine if the second contacts exist in an address book; an extraction unit configured to, in response to the second contacts existing in the address book, extract the second contacts in the address book as frequent contacts; and a generation unit configured to generate a list of frequent contacts based on at least information associated with the frequent contacts. For example, the device is implemented according to at least FIG. 8, FIG. 9, FIG. 10, and/or FIG. 11.

According to yet another embodiment, a terminal includes: a display and a device for contacts management. The device for contacts management includes: a reading unit configured to receive one or more first contacts included in a communication log, wherein the communication log includes a call log or an SMS log; a calculation unit configured to calculate contact frequencies of the first contacts based on at least information associated with the communication log; a selection unit configured to select one or more second contacts to be managed from the first contacts based on at least information associated with the contact frequencies; a judgment unit configured to determine if the second contacts exist in an address book; an extraction unit configured to, in response to the second contacts existing in the address book, extract the second contacts in the address book as frequent contacts; and a generation unit configured to generate a list of frequent contacts based on at least information associated with the frequent contacts. The display is connected to the device for contacts management to display the list of frequent contacts generated by the device for contacts management. For example, the terminal is implemented according to at least FIG. 12.

According to yet another embodiment, a non-transitory computer readable storage medium includes programming instructions for contacts management. The programming instructions are configured to cause one or more data processors to execute certain operations. For example, one or more first contacts included in a communication log are received, wherein the communication log includes a call log or an SMS log; contact frequencies of the first contacts are calculated based on at least information associated with the communication log; one or more second contacts are selected to be managed from the first contacts based on at least information associated with the contact frequencies; if the second contacts exist in an address book is determined; and in response to the second contacts existing in the address book, the second contacts in the address book are extracted as frequent contacts; and a list of frequent contacts are generated based on at least information associated with the frequent contacts. For example, the storage medium is implemented according to at least FIG. 1, FIG. 2, FIG. 6, and/or FIG. 7.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for contacts management, comprising:
receiving one or more first contacts included in a communication log, wherein the communication log includes a call log or a Short Messaging Services (SMS) log;
calculating contact frequencies of the first contacts based on at least information associated with the communication log;
selecting one or more second contacts to be managed from the first contacts based on at least information associated with the contact frequencies, comprising:
sorting the first contacts in a descending order based on at least information associated with the contact frequencies and selecting the second contacts from the sorted first contacts, the second contacts corresponding to one or more largest contact frequencies; or
selecting, from the first contacts, the one or more second contacts corresponding to the contact frequencies larger than a predetermined threshold;
determining when the second contacts exist in an address book;
in response to the second contacts existing in the address book, extracting the second contacts in the address book as frequent contacts;
generating a list of frequent contacts based on at least information associated with the frequent contacts, comprising sorting the frequent contacts based on at least information associated with the contact frequencies (k) in a descending order to generate the list of frequent contacts;
in response to one or more operating instructions related to the frequent contacts, outputting an identification of an application shared with or recommended to the frequent contacts;
filtering the frequent contacts in the list of frequent contacts from the address book to obtain one or more third contacts; and
combining the list of frequent contacts as a subgroup and the one or more third contacts, comprising adding the list of frequent contacts as a subgroup to a place above the one or more third contacts in the address book.

2. The method of claim 1, wherein in response to the communication log including a call log, the calculating contact frequencies of the first contacts based on at least information associated with the communication log comprises:
receiving one or more call descriptions (R) associated with the first contacts, wherein the call descriptions (R) include a number (N1) of calls associated with the first contacts; and
calculating the contact frequencies (k) of the first contacts based on at least information associated with a total number (TR) of calls and the call descriptions (R) associated with the first contacts.

3. The method of claim 2, wherein:
the call descriptions (R) further include a first list (C1) of beginning times of the calls associated with the first contacts and a second list (D1) of call periods of the calls associated with the first contacts; and the calculating the contact frequencies (k) of the first contacts based on at least information associated with a total number (TR) of calls and the call descriptions (R) associated with the first contacts comprises:
calculating the contact frequencies (k) of the first contacts using a contact-frequency-calculation function (fun), the total number (TR) of calls and the call descriptions (R) associated with the first contacts being used as input parameters to the contact-frequency-calculation function (fun).

4. The method of claim 1, wherein in response to the communication log including an SMS log, the calculating contact frequencies of the first contacts based on at least information associated with the communication log comprises:
receiving one or more SMS descriptions (M) associated with the first contacts, wherein the SMS descriptions (M) include a number (N2) of SMS messages associated with the first contacts; and
calculating the contact frequencies (k) of the first contacts based on at least information associated with a total number (TS) of SMS messages and the SMS descriptions (M) associated with the first contacts.

5. The method of claim 4, wherein:
the SMS descriptions (M) further include a first list (T2) of sending times and receiving times of the SMS messages associated with the first contacts; and
the calculating the contact frequencies (k) of the first contacts based on at least information associated with a total number (TS) of SMS messages and the SMS descriptions (M) associated with the first contacts comprises:
calculating the contact frequencies (k) of the first contacts using a contact-frequency-calculation function (fun), the total number (TS) of SMS messages and the SMS descriptions (M) associated with the first contacts being used as input parameters to the contact-frequency-calculation function (fun).

6. The method of claim 1, wherein in response to the communication log including a call log and an SMS log, the calculating contact frequencies of the first contacts based on at least information associated with the communication log comprises:
receiving one or more call descriptions (R) associated with one or more fourth contacts, wherein the call descriptions (R) include a first number (N1) of calls associated with the third contacts, the fourth contacts being included in the first contacts;
receiving one or more SMS descriptions (M) associated with one or more fifth contacts, wherein the SMS descriptions (M) include a second number (N2) of SMS messages associated with the fifth contacts, the fifth contacts being included in the first contacts; and
in response to the fifth contacts being the same as the fourth contacts, calculating the contact frequencies (k) of the first contacts based on at least information associated with a total number (TR) of calls, the call descriptions (R) associated with the fourth contacts, a total number (TS) of SMS messages and the SMS descriptions (M) associated with the fifth contacts.

7. The method of claim 6, wherein:
the call descriptions (R) further include a first list (C1) of beginning times of the calls associated with the fourth contacts and a second list (D1) of call periods of the calls associated with the fourth contacts;

the SMS descriptions (M) further include a third list (T2) of sending times and receiving times of the SMS messages associated with the fifth contacts; and
the calculating the contact frequencies (k) of the first contacts based on at least information associated with a total number (TR) of calls, the call descriptions (R) associated with the fourth contacts, a total number (TS) of SMS messages and the SMS descriptions (M) associated with the fifth contacts in response to the fourth fifth contacts being the same as the fourth contacts comprises:
calculating the contact frequencies (k) of the first contacts using a contact-frequency-calculation function (fun), the total number (TR) of calls, the call descriptions (R) associated with the fourth contacts, the total number (TS) of SMS messages and the SMS descriptions (M) associated with the fifth contacts being used as input parameters to the contact-frequency-calculation function (fun).

8. A device for contacts management, comprising:
a reading unit configured to receive one or more first contacts included in a communication log, wherein the communication log includes a call log or a Short Messaging Services (SMS) log;
a calculation unit configured to calculate contact frequencies of the first contacts based on at least information associated with the communication log;
a selection unit configured to select one or more second contacts to be managed from the first contacts based on at least information associated with the contact frequencies, wherein:
the selection unit is configured to sort the first contacts in a descending order based on at least information associated with the contact frequencies and select the second contacts from the sorted first contacts starting, the second contacts corresponding to one or more largest contact frequencies; or
the selection unit is configured to select, from the first contacts, the one or more second contacts corresponding to the contact frequencies larger than a predetermined threshold;
a judgment unit configured to determine when the second contacts exist in an address book;
an extraction unit configured to, in response to the second contacts existing in the address book, extract the second contacts in the address book as frequent contacts;
a generation unit configured to generate a list of frequent contacts based on at least information associated with the frequent contacts, wherein the generation unit is configured to sort the frequent contacts based on at least information associated with the contact frequencies (k) in a descending order to generate the list of frequent contacts;
one or more data processors;
a non-transitory computer-readable storage medium;
wherein one or more of the reading unit, the calculation unit, the selection unit, the judgment unit, the extraction unit and the generation unit is stored in the non-transitory computer-readable storage medium and configured to be executed by the one or more data processors;
an output unit configured to, in response to one or more operating instructions related to the frequent contacts, output an identification of an application shared with or recommended to the frequent contacts;

a filtering unit configured to filter the frequent contacts in the list of frequent contacts from the address book to obtain one or more third contacts; and a combination unit configured to combine the list of frequent contacts as a subgroup and the one or more third contacts, wherein the combination unit is configured to add the list of frequent contacts as a subgroup on top of the one or more third contacts stored in the address book.

9. The device of claim 8, wherein in response to the communication log including a call log, the calculation unit comprises:

a reading subunit configured to receive one or more call descriptions (R) associated with the first contacts, wherein the call descriptions (R) include a number (N1) of calls associated with the first contacts; and a calculation subunit configured to calculate the contact frequencies (k) of the first contacts based on at least information associated with a total number (TR) of calls and the call descriptions (R) associated with the first contacts.

10. The device of claim 9, wherein:

the call descriptions (R) further include a first list (C1) of beginning times of the calls associated with the first contacts and a second list (D1) of call periods of the calls associated with the first contacts; and the calculation subunit is further configured to calculate the contact frequencies (k) of the first contacts using a contact-frequency-calculation function (fun), the total number (TR) of calls and the call descriptions (R) associated with the first contacts being used as input parameters to the contact-frequency-calculation function (fun).

11. The device of claim 8, wherein in response to the communication log including an SMS log, the calculation unit comprises:

a reading subunit configured to receive one or more SMS descriptions (M) associated with the first contacts, wherein the SMS descriptions (M) include a number (N2) of SMS messages associated with the first contacts; and a calculation subunit configured to calculate the contact frequencies (k) of the first contacts based on at least information associated with a total number (TS) of SMS messages and the SMS descriptions (M) associated with the first contacts.

12. The device of claim 11, wherein:

the SMS descriptions (M) further include a list (T2) of sending times and receiving times of the SMS messages associated with the first contacts; and the calculation subunit is further configured to calculate the contact frequencies (k) of the first contacts using a contact-frequency-calculation function (fun), the total number (TS) of SMS messages and the SMS descriptions (M) associated with the first contacts being used as input parameters to the contact-frequency-calculation function (fun).

13. The device of claim 8, wherein in response to the communication log including a call log and an SMS log, the calculation unit comprises:

a first reading subunit configured to receive one or more call descriptions (R) associated with one or more fourth contacts, wherein the call descriptions (R) include a first number (N1) of calls associated with the fourth contacts, the fourth contacts being included in the first contacts;

a second reading subunit configured to receive one or more SMS descriptions (M) associated with one or more fifth contacts, wherein the SMS descriptions (M) include a second number (N2) of SMS messages associated with the fifth contacts, the fifth contacts being included in the first contacts; and a first calculation subunit configured to, in response to the fifth contacts being the same as the fourth contacts, calculate the contact frequencies (k) of the first contacts based on at least information associated with a total number (TR) of calls, the call descriptions (R) associated with the fourth contacts, a total number (TS) of SMS messages and the SMS descriptions (M) associated with the fifth contacts.

14. The device of claim 13, wherein:

the call descriptions (R) further comprise a first list (C1) of beginning times of the calls associated with the fourth contacts and a second list (D1) of call periods of the calls associated with the fourth contacts;

the SMS descriptions (M) further include a third list (T2) of sending times and receiving times of the SMS messages associated with the fifth contacts; and the first calculation subunit is further configured to, in response to the fifth contacts being the same as the fourth contacts, calculate the contact frequencies (k) of the first contacts using a contact-frequency-calculation function (fun), the total number (TR) of calls, the call descriptions (R) associated with the fourth contacts, the total number (TS) of SMS messages and the SMS descriptions (M) associated with the fifth contacts being used as input parameters to the contact-frequency-calculation function (fun).

15. A terminal comprising:

a display; and a device for contacts management;

wherein the device for contacts management includes:

a reading unit configured to receive one or more first contacts included in a communication log, wherein the communication log includes a call log or a Short Messaging Services (SMS) log;

a calculation unit configured to calculate contact frequencies of the first contacts based on at least information associated with the communication log;

a selection unit configured to select one or more second contacts to be managed from the first contacts based on at least information associated with the contact frequencies, wherein:

the selection unit is configured to sort the first contacts in a descending order based on at least information associated with the contact frequencies and select the second contacts from the sorted first contacts starting, the second contacts corresponding to one or more largest contact frequencies; or the selection unit is configured to select, from the first contacts, the one or more second contacts corresponding to the contact frequencies larger than a predetermined threshold;

a judgment unit configured to determine when the second contacts exist in an address book;

an extraction unit configured to, in response to the second contacts existing in the address book, extract the second contacts in the address book as frequent contacts;

a generation unit configured to generate a list of frequent contacts based on at least information associated with the frequent contacts, wherein the generation unit is configured to sort the frequent contacts based on at least information associated with the contact frequencies (k) in a descending order to generate the list of frequent contacts;

a filtering unit configured to filter the frequent contacts in the list of frequent contacts from the address book to obtain one or more third contacts;

a combination unit configured to combine the list of frequent contacts as a subgroup and the one or more third contacts, wherein the combination unit is configured to add the list of frequent contacts as a subgroup on top of the one or more third contacts stored in the address book; and an output unit configured to, in response to one or more operating instructions related to the frequent contacts, output an identification of an application shared with or recommended to the frequent contacts, wherein the display is connected to the device for contacts management to display the list of frequent contacts generated by the device for contacts management.

16. A non-transitory computer readable storage medium comprising programming instructions for contacts management, the programming instructions configured to cause one or more data processors to execute operations comprising:

receiving one or more first contacts included in a communication log, wherein the communication log includes a call log or a Short Messaging Services (SMS) log;

calculating contact frequencies of the first contacts based on at least information associated with the communication log;

selecting one or more second contacts to be managed from the first contacts based on at least information associated with the contact frequencies, comprising:

sorting the first contacts in a descending order based on at least information associated with the contact frequencies and selecting the second contacts from the sorted first contacts, the second contacts corresponding to one or more largest contact frequencies; or selecting, from the first contacts, the one or more second contacts corresponding to the contact frequencies larger than a predetermined threshold;

determining when the second contacts exist in an address book; and in response to the second contacts existing in the address book, extracting the second contacts in the address book as frequent contacts;

generating a list of frequent contacts based on at least information associated with the frequent contacts, comprising sorting the frequent contacts based on at least information associated with the contact frequencies (k) in a descending order to generate the list of frequent contacts;

filtering the frequent contacts in the list of frequent contacts from the address book to obtain one or more third contacts;

combining the list of frequent contacts as a subgroup and the one or more third contacts, comprising adding the list of frequent contacts as a subgroup to a place above the one or more third contacts in the address book; and in response to one or more operating instructions related to the frequent contacts, outputting an identification of an application shared with or recommended to the frequent contacts.

* * * * *